Figure 1:
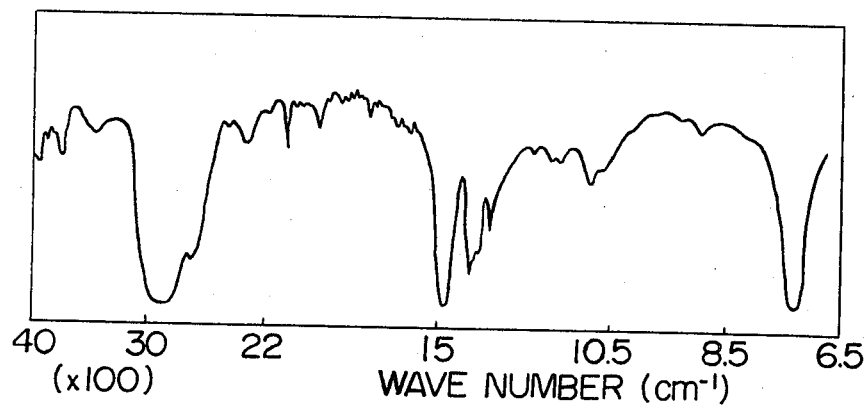

United States Patent

Kagiya et al.

[15] 3,663,391

[45] May 16, 1972

[54] SOLUTION POLYMERIZATION OF ETHYLENE BY IONIZING RADIATION IN THE PRESENCE OF CHLOROFLUORINATED HYDROCARBONS

[72] Inventors: Tsutomu Kagiya, Kyoto-shi; Miyuki Hagiwara; Hidemasa Okamoto, both of Takasaki-shi, all of Japan

[73] Assignee: Japan Atomic Energy Research Institute

[22] Filed: Apr. 17, 1969

[21] Appl. No.: 817,005

[30] Foreign Application Priority Data

Apr. 25, 1968 Japan.................................43/28107

[52] U.S. Cl.........................................204/159.22, 260/94.9
[51] Int. Cl. .....................C08d 1/00, C08d 3/04, C08f 1/16
[58] Field of Search....................260/87.7, 87.5; 204/159.22

[56] References Cited

UNITED STATES PATENTS 3,023,187    2/1962    Lo .........................................260/87.7

FOREIGN PATENTS OR APPLICATIONS 835,121    5/1960    Great Britain....................204/159.22

*Primary Examiner*—Murray Tillman
*Assistant Examiner*—Richard B. Turer
*Attorney*—Harry C. Bierman, Jordan B. Bierman and Bierman and Bierman

[57] ABSTRACT

Ethylene is irradiated with ionizing radiation under high pressure and in the presence of a chlorofluorinated hydrocarbon general formula $$C_nF_mCl_{2n+2-m}$$

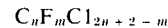

wherein $n$ is 1 or 2 and $m$ is 1–3 when $n$ is 1 and 1–5 when $n$ is 2. A high molecular weight polyethylene is thus readily obtained and in a good yield.

4 Claims, 2 Drawing Figures

Kagiya, Hagiwara & Okamoto, INVENTORS.

BY Bierman & Bierman, ATTORNEYS.

SOLUTION POLYMERIZATION OF ETHYLENE BY IONIZING RADIATION IN THE PRESENCE OF CHLOROFLUORINATED HYDROCARBONS

SUMMARY OF THE INVENTION

The present invention relates to an improved process for the solution polymerization of ethylene by ionizing radiation.

The process of polymerizing ethylene by means of ionizing radiation is known. Said known process obviates the necessity for using a catalyst which must be removed after the polymerization as well as the necessity for employing high pressure. Further, since the rate of polymerization is increased as the reaction temperature is decreased to, for example, 20°–30 C., a high density, high molecular weight polyethylene having fewer branched chains can be readily obtained. Accordingly, it is desirable to conduct the polymerization of ethylene by ionizing radiation at a comparatively low temperature. However, if the polymerization is conducted at a temperature lower than the melting point of polyethylene, the polyethylene is produced in the form of a powder. This powder accumulates on the inner walls of the reactor and conduits and finally clogs them. This makes it difficult to operate the polymerization in a continuous manner.

A method has been proposed wherein the polymerization of ethylene by ionizing radiation is carried out in a solvent such as water, ethanol, carbon tetrachloride, or benzene (cf. Henley et al, "J. Polymer Sci."; 36, 511 (1959); Medvedev et al., "Polymer Sci." Sci. USSR, 2, 457 (1961); and U.S. Pat. No. 2,287,445). However, the use of such solvent adversely effects the polymerization reaction of ethylene and reduces the yield and/or the molecular weight of the polyethylene produced. From an economical view point, this is obviously undesirable.

One object of the present invention is to provide a process for the solution polymerization of ethylene by ionizing radiation wherein the energy of ionizing radiation is utilized with high efficiency.

Another object of this invention is to provide a process for the polymerization of ethylene wherein during the polymerization of ethylene the heat of reaction is effectively removed and the reaction is carried out safely and profitably.

Still another object of the present invention is to provide a process for readily producing polyethylene having a high molecular weight.

A further object of the present invention is to provide a continuous process for carrying out the polymerization of ethylene by ionizing radiation.

Other objects and the merits of the present invention will become apparent from the following descriptions.

The above-mentioned objects of the present invention can be attained by irradiating ethylene with high energy ionizing radiations, under high pressure and using as a solvent a chlorofluorinated hydrocarbon represented by the general formula $C_nF_mCl_{2n+2-m}$ wherein $n$ is 1 or 2 and $m$ is 1–3 when $n$ is 1 and 1–5 when $n$ is 2.

As a result of investigations on the polymerization of ethylene by ionizing radiation, it has been found that the above mentioned clogging of the reactors or conduits may be overcome by employing a solvent. Further, the solvent (1) must not interfere with the ethylene polymerization reaction, (2) must not be decomposed severely by the high energy ionizing radiation or when subjected to irradiation cause side reactions with ethylene, (3) must be readily separable from the polyethylene thus formed, (4) must be readily available in pure form, and (5) must preferably be a high density liquid since the amount of ionizing radiation energy absorbed in proportional to the electron density of the material subjected to the ionizing radiation. This last point teaches that the solvent can be used as a material for effectively absorbing the energy of ionizing radiation. Based upon these above mentioned requirements, various solvents have been studied. As a result of these studies it has been found that the chlorofluorinated hydrocarbon represented by the above mentioned general formula fulfills said requirements and is a suitable solvent in the method of the invention.

It has been found that by conducting the polymerization of ethylene by ionizing radiation in the presence of a chlorofluorinated hydrocarbon, the energy of ionizing radiation employed in the reaction can be effectively absorbed by the solvent, and further, that the solvent decomposes to form highly reactive radicals which serve to remarkably increase the rate of polymerization as compared with rates obtained in conventional vapor-phase polymerization reactions. Furthermore, it has also been found that since the polyethylene thus formed is withdrawn from the reaction system along with the chlorofluorinated hydrocarbon, the attaching of the polyethylene to the inner walls of the reactor or conduits as well as the clogging of the reactor or conduits by the polyethylene is completely prevented. Still further, it has also been found that the heat of reaction can be effectively removed by the solvent. Moreover, it has also been found that the polymerization reaction of ethylene is not affected by the presence of the chlorofluorinated hydrocarbon. Consequently, the polyethylene obtained is very pure as is shown in FIG. 1 by its infrared spectrum. In addition, the molecular weight of the polyethylene which is produced is higher than the molecular weight of polyethylenes prepared with the use of conventional solvents.

The ethylene used as the main raw material in the process of this invention should be highly pure. However, any ethylene presently used in the polyethylene manufacturing industry may be effectively used in the present invention. It should be noted though that the intermixing of a large proportion of oxygen should be avoided.

The chlorofluorinated hydrocarbon represented by the general formula $C_nF_mCl_{2n+2-m}$ should be a solvent having a high density and be liquid or readily liquifiable. Typical examples of such solvents are fluorotrichloromethane, difluorodichloromethane, trifluorochloromethane, trifluorotrichloroethane, tetrafluorodichloroethane, and pentafluorochloroethane.

The amount of chlorofluorinated hydrocarbon solvent used depends upon the kind of chlorofluorinated hydrocarbon employed, the reaction pressure, and the reaction temperature. Hence, the amount is determined in each case by the reaction conditions. If the amount of chlorofluorinated hydrocarbon used is too small, the entire reaction system will not be in a liquid or vapor-liquid state. While, if the amount of chlorofluorinated hydrocarbon used is too large, the amount of ethylene supplied at a definite pressure will be decreased and the rate of polymerization will decrease. Generally, the amount of solvent employed is usually from 5–90 percent by volume, preferably 40–80 percent by volume, of the reactor to be employed.

MOreover, in the process of this invention, the aforesaid chlorofluorinated hydrocarbon may be used, if necessary, as a mixture thereof with another solvent or solvents; as for example, a saturated hydrocarbon such as propane, butane, pentane, and hexane; a cyclic saturated hydrocarbon such as cyclopentane and cyclohexane; various halides of an aliphatic hydrocarbon including methane and ethane; an alcohol such as methanol, ethanol, propanol, butanol and the like; and a ketone such as dimethyl ketone and methyl ethyl ketone. Moreover, by using a mixed solvent of the chlorofluorinated hydrocarbon and liquefied carbon dioxide, the reaction system may be maintained in the liquid state even though a small proportion of chlorofluorinated hydrocarbon is employed.

The high energy ionizing radiations employed in the process of this invention are $\alpha$-rays, $\beta$-rays, $\alpha$-rays, X-rays, electron beam, and the like. Although there need be no particular limitation of the radiation intensity of the ionizing radiations, the radiation intensity employed generally ranges from 100 to 1,000,000 roentgens per hour.

The process of this invention is conducted under a high pressure of 100–1,000 atms. The pressure should preferably be as high as possible as the reaction rate rapidly increases with the increase in pressure. However, since an increase in pressure means an increase in installation cost one must, in determining the pressure, consider the economical factors involved.

The reaction temperature may be any temperature at which the aforesaid chlorofluorinated hydrocarbon is in the liquid state. In other words, the reaction temperature may range from the melting point of the solvent to the crystical temperature of the solvent under the pressure employed. Generally the reaction temperature is from −50° C. to 200° C., preferably from 0° C. to 150° C.

According to the method of the invention, the chlorofluorinated hydrocarbon is withdrawn from a pressure vessel through a reducing valve and a definite amount thereof is supplied to a pressure-resistant reaction vessel. Liquid ethylene is then pressed into the reaction vessel under pressure. Alternatively, the chlorofluorinated hydrocarbon and the ethylene can be pressed into the pressure-resistant reaction vessel as a mixture of chlorofluorinated hydrocarbon and ethylene, in a predetermined ratio. Then, while maintaining the reaction vessel at a definite pressure and a definite temperature, the system is irradiated with ionizing radiations.

The process of the invention will now be explained with reference to a preferred embodiment thereof, said embodiment being shown in FIG. 2.

Figure 2:
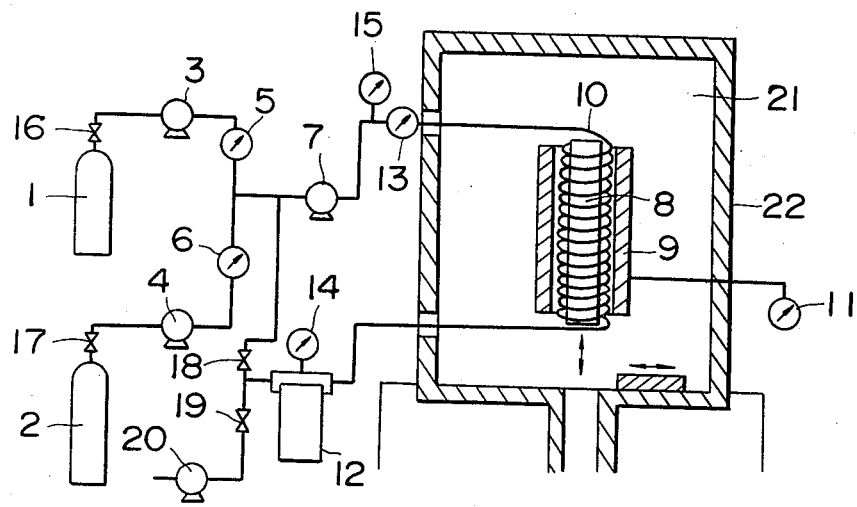

In said FIG. 2, the numeral 1 designates an ethylene storage tank; 2 designates a chlorofluorinated hydrocarbon storage tank; 3 and 4 designate pumps; 5 and 6 designate flowmeters; 7 designates a compressor; 8 designates a source of high energy ionizing radiation; 9 designates a heater, 10 designates a reactor; 11 designates a temperature-control recorder; 12 designates a polymer receiver; 13 designates a flowmeter; 14 and 15 are pressure gauges; 16, 17, 18 and 19 designate valves; 20 designates a vacuum pump; 21 designates an irradiation room; and 22 designates a heavy concrete wall. Source 8 is placed so that it can be introduce into the irradiation room when required.

First, the entire apparatus is evacuated by means of vacuum pump 20. Then the chlorofluorinated hydrocarbon is introduced into the apparatus by means of pump 4 so that the air in the system is completely replaced by the chlorofluorinated hydrocarbon. Then a mixture of ethylene and chlorofluorinated hydrocarbon is introduced into reactor 10 under pressure through compressor 7. The mixing ratio of the ethylene and the chlorofluorinated hydrocarbon is adjusted by means of flowmeters 5 and 6. Source 8 is then raised so that it irradiates the reactor 10. The reactor 10 is heated during the conducting of the ethylene polymerization by means of heater 9. Since the polyethylene that forms is in a state of dispersion in the mixture of chlorofluorinated hydrocarbon and unreacted ethylene, it may be readily removed from the system and accumulated in receiver 12. The unreacted ethylene and the chlorofluorinated hydrocarbon are recovered and an amount of ethylene equivalent to that which was consumed in the polymerization reaction is added thereto. The mixture is then recycled into the reactor.

The following examples are offered for purposes of illustrating the present invention and not for purposes of limiting same.

EXAMPLE 1

A stainless steel pipe having an inside diameter of 3 mm, an outside diameter of 6 mm, and a length of 10 meters was coiled in a diameter of about 30 cm to provide a reaction pipe. Solution polymerization of ethylene by ionizing radiation was conducted for 5 hours using the apparatus shown in FIG. 2 under the following reaction conditions:

| | |
|---|---|
| Reaction temperature | 30°C |
| Reaction pressure | 400 kg/sq.cm. |
| Weight ratio of ethylene to tetrafluorodichloroethane | 2/1 |
| Flow speed in the reaction system | 0.67 meter/min. |
| Retention time in the reactor | 15 min. |
| Radiation intensity from Cobalt-60 | 90,000 roentgens/hr. |

No clogging occurred during the operation in either the reaction tube or the pipe lines running from the reactor to the receiver. All of the polyethylene produced was accumulated in receiver 12. The yield of polyethylene was 7.2 g and its molecular weight was 49,000.

EXAMPLE 2

50 ml. of tetrafluorodichloroethane were charged into a 100 milliliter stainless steel pressure vessel. The air in the pressure vessel was then purged with ethylene under pressure. Ethylene was then pressed into the vessel until the pressure inside the vessel was increased to 300 atms. The system was then irradiated with α-rays from cobalt-60 at a radiation intensity of 25,000 roentgens/hr. for 1 hour and at 23° C. 0.31 g of polyethylene having a molecular weight of 50,000 was obtained.

In addition, for comparative purposes, the above procedure was repeated first without using the aforesaid solvent and then using instead of tetrafluorodichloroethane, each of the solvents shown in the following table 1. The results obtained are shown in the following table 1.

TABLE 1

| Solvent | Yield of Polyethylene | Average molecular weight |
|---|---|---|
| Tetrafluorodichloroethane* | 0.31 | 50,000 |
| None | 0.27 | 115,000 |
| n-Hexane | 0.03 | 5,000 |
| Cyclohexane | 0.17 | 3,000 |
| Carbon tetrachloride | 0.08 | 1,000 |
| Methanol | 0.25 | 9,900 |
| Acetone | 0.10 | 9,900 |
| Ethyl ether | 0.12 | 1,900 |
| Liquefied carbon dioxide | 0.10 | 25,000 |
| Water | 0.21 | 110,000 |

(*): the example of the present invention

EXAMPLE 3

20 ml of tetrafluorodichloroethane were charged into a 100 milliliter stainless steel pressure vessel. Then ethylene was pressed into the vessel until the inside pressure was increased to 400 atms. The system was then irradiated with α-rays from cobalt-60 at a radiation intensity of 90,000 roentgens/hr. for 40 minutes and at 30° C. 1.39 g of polyethylene having a molecular weight of 51,000 were obtained. For comparative purposes the above procedure was repeated without using tetrafluorodichloroethane. Only 0.88 g of a polymer having a molecular weight of 200,000 was obtained.

EXAMPLE 4

A reaction system as described in Example 3 was used. However, a solvent mixture of 3.5 ml. of dichlorotetrafluoroethane and 20 g. of liquefied carbon dioxide was employed instead of 50 ml of tetrafluorodichloroethane. The mixture was irradiated with α-rays from cobalt-60 at a radiation intensity of 25,000 for 3 hours. 1.24 g. of a polymer having a molecular weight of 132,000 were obtained. In addition, when the above procedure was repeated using 20 g. of liquefied carbon dioxide and no tetrafluorodichloroethane, only 0.816 g. of polyethylene having a molecular weight of 139,000 was obtained.

EXAMPLE 5

The same reaction system as described in Example 4 was employed. However, pentafluorochloroethane was used instead of tetrafluorodichloroethane. 38 g. of ethylene were polymerized under the conditions described in Example 4. 1.06 g. of polyethylene having a molecular weight of 151,000 were obtained.

EXAMPLES 6–10

Tetrafluorodichloroethane or difluorodichloromethane was charged into a 100 milliliter stainless steel pressure vessel. Then after pressing compressed ethylene into the vessel, the system was irradiated with α-rays from cobalt-60 under the conditions shown in the following table 2. The results obtained are shown in table 2.

TABLE 2

| Experiment No. | Solvent | | Reaction pressure (kg./cm.³) | Reaction temp. (° C.) | Radiation intensity (r./hr.) | Reaction time (hr.) | Yield for polymer (g.) | Molecular weight |
|---|---|---|---|---|---|---|---|---|
| | Kind | Amount (ml.) | | | | | | |
| 6 | $C_2F_4Cl_2$ | 50 | 400 | 30 | 25,000 | 1 | 0.575 | 68,000 |
| 7 | $C_2F_4Cl_2$ | 50 | 800 | 30 | 25,000 | 1 | 2.64 | 128,000 |
| 8 | $C_2F_4Cl_2$ | 50 | 400 | 90 | 25,000 | 1 | 0.601 | 19,000 |
| 9 | $C_2F_4Cl_2$ | 50 | 400 | 30 | 380,000 | 1 | 5.44 | 52,000 |
| 10 | $CF_2Cl_2$ | 20 | 400 | 30 | 25,000 | 1 | 0.580 | 85,000 |

We claim:

1. A process for the solution polymerization of ethylene which comprises subjecting ethylene under pressure and in a solvent to ionizing radiation at a radiation dose of from 100–1,000,000 roentgens per hour, said solvent being a chlorofluorinated hydrocarbon having the the general formula $C_nF_mCl_{2n+2-m}$ wherein $n$ is 1 or 2 and $m$ is 1–3 when $n$ is 1 and 1–5 when $n$ is 2, said ionizing radiation being alpha-rays, beta-rays, gamma-rays, X-rays or electron beam.

2. A process as described in claim 1 wherein said pressure is 100–1,000 kg/sq.cm. and said ethylene is subjected to ionizing radiation at a temperature of from −50° C. to 200° C.

3. A process for the solution polymerization of ethylene which comprises adding to ethylene a mixture of a chlorofluorinated hydrocarbon having the general formula
$$C_nF_mCl_{2n+2-m}$$
wherein $n$ is 1 or 2 and $m$ is 1–3 when $n$ is 1 and 1–5 when $n$ is 2, and an organic solvent selected from the group consisting of a halogenated hydrocarbon, an alcohol, and a ketone; then subjecting the resultant mixture to ionizing radiation at a radiation dose of from 100–1,000,000 roentgens per hour, while maintaining the mixture at a pressure of from 100 to 1,000 kg/sq.cm. and at a temperature of from −50° C. to 200° C., said ionizing radiation being alpha-rays, beta-rays, gamma-rays, X-rays or electron beam.

4. A process for the solution polymerization of ethylene which comprises adding to ethylene a mixture of a chlorofluorinated hydrocarbon having the general formula
$$C_nF_mCl_{2n+2-m}$$
wherein $n$ is 1 or 2 and $m$ is 1–3 when $n$ is 1 and 1–5 when $n$ is 2, and liquefied carbon dioxide; then subjecting the resultant mixture to ionizing radiation at a radiation dose of from 100–1,000,000 roentgens per hour, while maintaining the mixture at a pressure of from 100 to 1,000 kg/sq.cm. and at a temperature of from −50° C. to 200° C., said ionizing radiation being alpha-rays, beta-rays, gamma-rays, X-rays or electron beam.

* * * * *